Aug. 30, 1938.    M. E. THOMPSON    2,128,719
SELF-STARTING SYNCHRONOUS MOTOR
Filed March 4, 1936    3 Sheets-Sheet 1

INVENTOR
Milton E. Thompson
BY
Bartlett, Eyre, Scott & Keel
ATTORNEYS

Aug. 30, 1938.    M. E. THOMPSON    2,128,719
SELF-STARTING SYNCHRONOUS MOTOR
Filed March 4, 1936    3 Sheets-Sheet 2

INVENTOR
Milton E. Thompson
BY
Bartlett, Eyre, Scott & Keel
ATTORNEYS

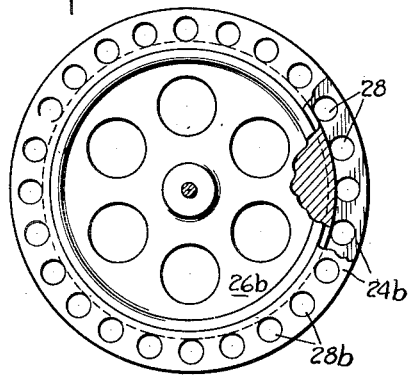
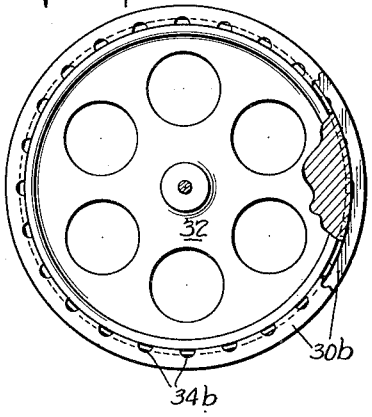
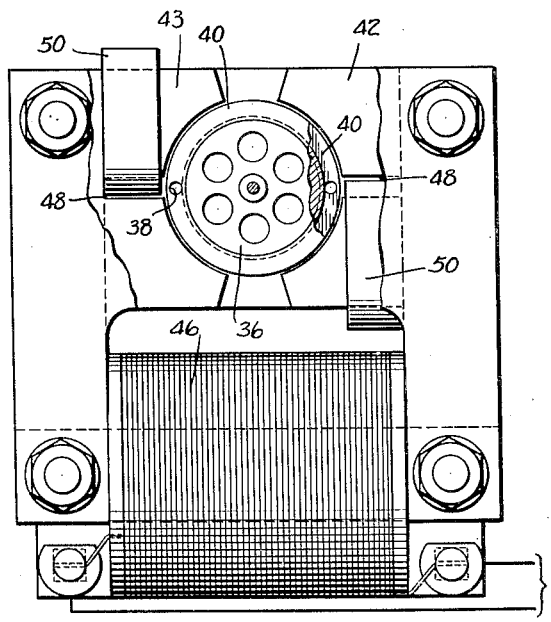
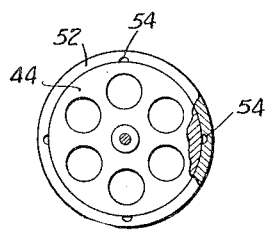
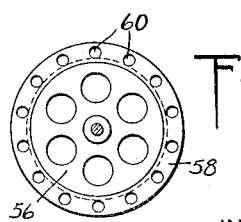

Patented Aug. 30, 193⸺

2,128,719

UNITED STATES PATENT OFFICE 2,128,719

SELF-STARTING SYNCHRONOUS MOTOR

Milton E. Thompson, Ridgway, Pa.

Application March 4, 1936, Serial No. 66,982

14 Claims. (Cl. 172—278)

The present invention relates to self-starting synchronous motors of the type used for driving the hands of electric clocks and comprises a relatively slow-speed single input motor which is efficient in operation, starts readily, pulls rapidly into synchronism and holds well at synchronism under load. The new motor is of relatively simple construction and is extremely economical in operation.

A feature of the new motor is the rotor portion which comprises one or more rings of hardened steel mounted on a non-magnetic spider and having perforations or equivalent reductions in thickness at suitable intervals. A rotor so constructed has sufficient inductive torque at standstill to insure proper starting. It also polarizes readily as the motor reaches synchronism and has excellent synchronizing power. The new rotor may be used with field structures having two or more poles and a single field winding.

Various embodiments of the invention are illustrated in the accompanying drawings of which:

Figs. 5, 6, 7, 8 and 9 are views, similar to Fig. 4 of rotors constructed according to the invention suitable for use with the field structure of the motor of Figs. 1 to 3;

Fig. 10 is a face view, partly broken away, of a bi-polar motor embodying the invention; and Figs. 11 and 12 illustrate other rotors suitable for use in the field structure of the motor of Fig. 10.

Figure 1:
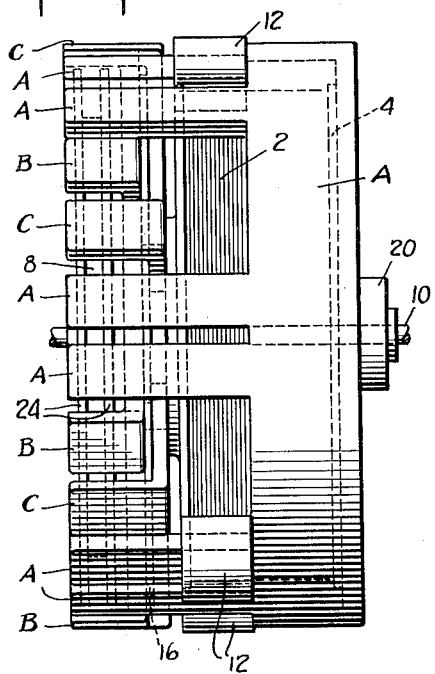
Fig. 1 is a side view of a cylindrical, single input multi-polar synchronous motor embodying the invention.

The multi-polar cylindrical motor illustrated in Figs. 1 to 4 inclusive comprises a single field coil 2 wound on an insulating spool 4, a steel magnetic field circuit made up of three parts indicated as A, B and C, and hereinafter more fully described, the rotor 8 and steel rotor shaft 10.

The magnetic part A is a cup-shaped piece having a central hub portion on which is mounted the insulating spool 4, a rear portion forming the rear surface of the motor and a cylindrical portion surrounding a portion of the field coil 2 and having six pairs of forwardly extending portions forming pole pieces of like polarity. About one of each pair of pole pieces A is a band 12 of copper, or the like, forming a shading or damping ring and causing the magnetic flux in the shaded pole section to lag behind that of the unshaded pole section.

The magnetic part B is a generally disk-shaped member having a central reentrant portion 14 mounted on the forward end of the hub portion of magnetic part A and carrying six portions which extend radially and then forwardly to form shaded pole pieces of opposite polarity to that of the shaded pole pieces A, the shading being effected by a disk 16 of copper or the like having a central aperture through which passes the reentrant central portion of magnetic part B.

Magnetic part C is an annular member mounted on the re-entrant central portion of part B and carrying six portions which like the pole pieces B, extend radially and forwardly to form pole pieces of opposite polarity to the unshaded pole pieces A.

The compact field structure above described is all mounted on a hollow bronze shaft 18, threaded at one end to receive a nut 20 and having a shoulder 22 on the other end engaging the forward surface of the reentrant central portion of part B.

The rotor 8 comprises a pair of hardened steel rings 24 carried on a bronze spider wheel 26 and each provided with a plurality of alined apertures 28.

The rotor 8 is mounted on shaft 10 and rotates within the space defined by the forwardly extending pole pieces A, B and C.

In operation, when a source of alternating current is applied across coil 2, a current flowing in one direction will magnetize all of the A pole pieces with a certain polarity. The magnetic flux from these A poles will pass into the rotor rings and through the rotor rings to the B and C poles, thus completing the magnetic circuit. When the current reverses the magnetic flux will be from the B and C pole pieces to the rotor and thence to pole pieces A. The damping bands 12 and damping ring 16 will cause the magnetic flux of one of each pair of A pole pieces and of pole pieces B to lag behind the magnetic flux of the undamped pole pieces. This produces a rotating field whose direction of rotation is always from the undamped pole sections toward the damped pole sections of the same polarity. In other words, the direction of rotation, in the particular embodiment of the invention illustrated, will be counter-clockwise as viewed in Fig. 3. Owing to the high hysteresis of the rotor rings, these rings offer a considerable resistance to the shifting forward of the magnetism passing through them and the result is a fairly strong torque tending to turn the rotor in the direction of the magnetic rotation. Thus the rotor will start from rest and speed up quickly to the full synchronous speed, which, for the motor above described, is 600 R. P. M.

The provision of apertures in the rotor rings, or something analogous thereto, as for example, reductions in thickness of the hardened steel rings at selected points, is essential if the rotor is to hold well at synchronism. For example, if hardened steel rings of uniform cross section throughout were employed in the field structure of Figs. 1 to 3, the rotor would start promptly but would not pull into or hold in synchronism. It is also important, from the standpoint of proper starting, that the rotor rings have a uniform thickness at their outer periphery. Rotors in which the rings are provided with teeth or with notches about their periphery would hold well at synchronism but would lock at standstill and hence not be self-starting.

Figure 4:
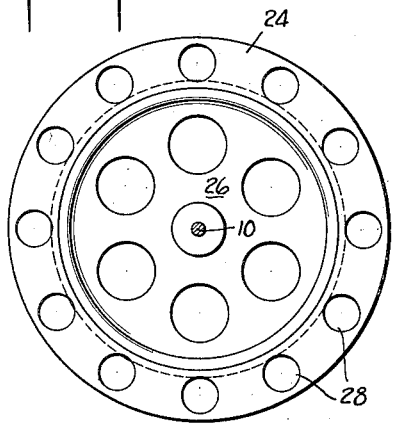
Fig. 4 is a view on a reduced scale of the rotor of the motor of Figs. 1 to 3.
Figure 5:
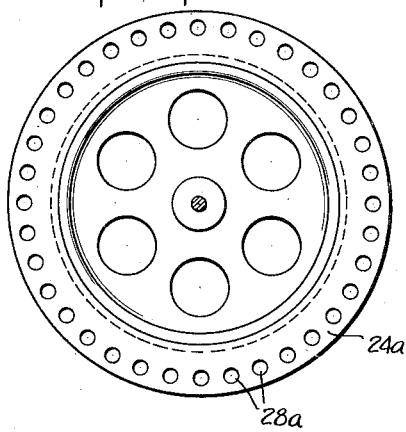

The number and size of the perforations in the rotor disks will influence to some extent at least the speed at which the motor will operate. With a twelve pole field structure the rotor of Fig. 4, with its twelve perforations 28 will speed up to full synchronous speed and hold well in synchronism under relatively heavy load. If the number of perforations in the rotor is thirty-six, the synchronous speed of the motor will still be 600 R. P. M. but at lower speeds there will be a synchronous braking effect opposing the inductive torque produced by the high hysteresis loss in the hardened steel rings, which braking effect, at relatively low inputs will be sufficient to cause the motor to operate at constant speed less than that of full synchronism. At higher inputs, such a rotor will speed up to the full synchronism speed. In Fig. 5 a rotor having 36 perforations 28a in the hardened steel disks 24a is illustrated. With such a rotor in the field structure of Figs. 1 to 3, the motor may be operated either at 200 R. P. M. or at 600 R. P. M., depending upon the input to the motor, upon the load and upon the total area of the perforations 28a.

Figure 2:
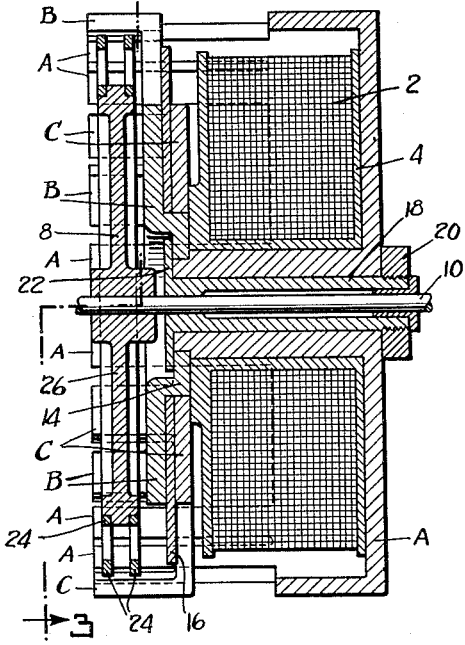
Fig. 2 is a vertical sectional view of the motor of Fig. 1.
Figure 3:
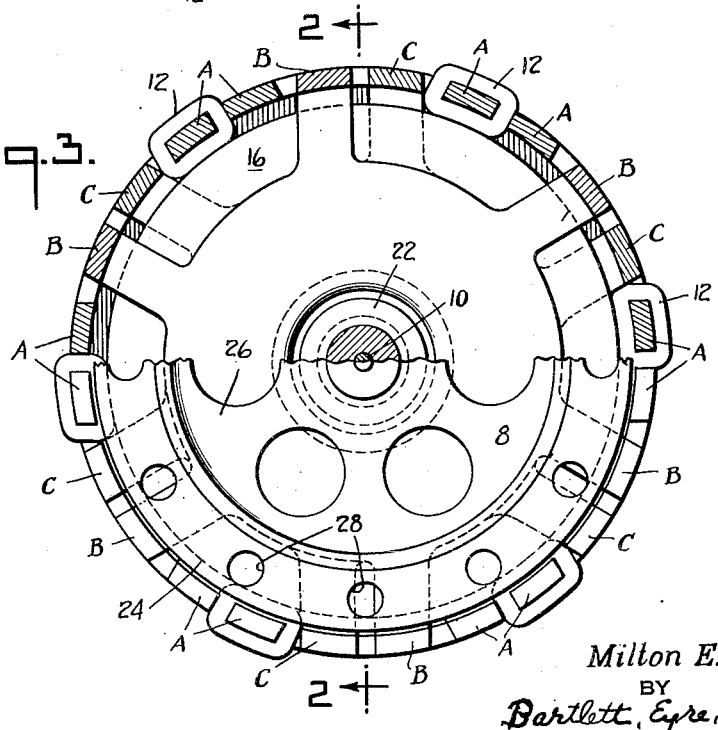
Fig. 3 is a view taken along the line 3—3 of Fig. 2.
Figure 6:
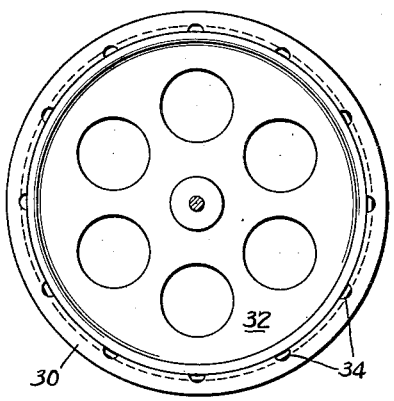

In Fig. 6 another form of rotor, suitable for use with the field structure of Figs. 1 to 3, is illustrated. The rotor of Fig. 6, like that of Fig. 4, includes a pair of hardened steel rings 30, mounted on a non-magnetic spider 32. The rings 30, instead of being perforated as in the rotor of Fig. 4, are provided with twelve notches 34 along their inner periphery. This arrangement is substantially equivalent to the perforations of the rotor of Fig. 4 and a rotor so constructed will function properly both in starting and at synchronism, when used with a suitable multi-polar field structure such as heretofore described. Its synchronous speed will be 600 R. P. M.

Figure 7:
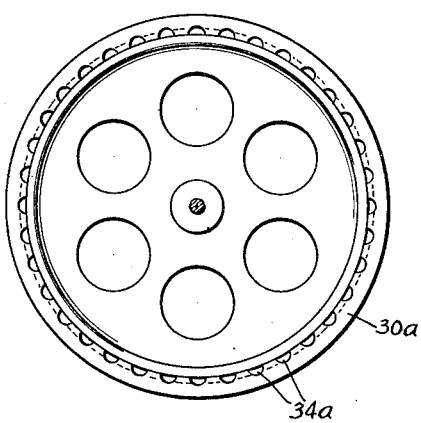

As an alternate arrangement for the rotor of Fig. 5 with its thirty-six perforations in its disks, the rotor of Fig. 7 having thirty-six internal notches on the rings 30a may be employed. Such a rotor in a twelve pole field structure may operate like the rotor of Fig. 5 at either 200 or 600 R. P. M.

If a speed of rotation of 300 R. P. M. is desired, the rotors of either Fig. 8 or 9 may be employed. In Fig. 8 a rotor comprising the spider 26b and a pair of steel rings 24b, each with twenty-four perforations 28b, is shown and in Fig. 9 a rotor equivalent thereto with twenty-four internal notches 34b in the disks 30b is shown. These rotors will operate either at 300 or 600 R. P. M. when inserted in a twelve pole field structure of the type described.

Rotors of the type above described may be advantageously employed in bi-polar as well as in multi-polar motors. In Fig. 10 a rotor 36 of the type of that shown in Fig. 4 but with correspondingly fewer perforations 38 in the hardened steel rings 40 thereof, is shown positioned between the arcuate faces of two poles 42 and 43 of a bi-polar motor, and in Fig. 11 a rotor 44 of the type of that shown in Fig. 9 but comprising a single hardened steel ring is shown. The bi-polar motor of Fig. 10 comprises a single field coil 46 and the two pole faces 42 and 43 each of which is divided by a deep slot 48 into two sections. One section of each pole face is shaded by a shading band 50 of copper, or the like, which passing through the slot 48 completely encircles that section. Rings 40 of rotor 36 are provided with two alined apertures 38 and the single ring 52 of rotor 44 with four notches 54 along the inner periphery.

In Fig. 12 another rotor suitable for use in the bi-polar field structure of Fig. 10 is shown as comprising a spider 56 and hardened steel rings 58 having fourteen perforations 60 therein. The full synchronous speed of the rotors of Figs. 10, 11 and 12 is 3600 R. P. M. but, because of the relatively greater number of notches or perforations in the rotors of Figs. 11 and 12 as compared to the number of poles, the rotor of Fig. 11 will operate successfully at eighteen hundred (1800) R. P. M. and that of Fig. 12 will operate successfully at five hundred and fourteen and two-sevenths (514 2/7ths) R. P. M.

The invention has now been described and several embodiments thereof have been illustrated. It will be apparent that the invention comprises a new synchronous motor that is self-starting and has a relatively slow synchronous speed. The motor is efficient in operation and relatively simple of constuction. In each embodiment of the invention a field structure including a single field coil and magnetic pole pieces divided into shaded and unshaded sections cooperates with a relatively simple rotor consisting of a hardened steel ring portion of uniform thickness about the periphery adjacent the field poles; the thickness of the ring portion being materially reduced at a plurality of points removed from the periphery which is adjacent the poles by cutting away portions of the ring at those points, as by forming the perforations and notches above described.

Although the new motor preferably includes a rotor having two relatively thin steel rings, rotors having more than two rings or having but a single ring, such as the rotor illustrated in Fig. 11, could be used if desired. Obviously other changes, both in the field structure and in the rotor of the motor heretofore described could be made without departing from the spirit of the invention, as will be apparent to those skilled in the art.

The following is claimed:

1. A self-starting synchronous motor having a magnetically rotating field stator and a rotor comprising a non-magnetic spider and a radially narrow ring portion of hardened steel mounted thereon, said ring portion having notches cut into that periphery of the ring which is farthest removed from the stator.

2. A self-starting synchronous motor having a magnetically rotating field stator and a rotor comprising a non-magnetic spider and a ring portion of hardened steel mounted thereon, said ring portion consisting of a plurality of radially narrow and axially thin rings having notches cut into that periphery of the rings which is farthest removed from the stator.

3. A self-starting synchronous motor having a magnetically rotating field stator, and a rotor comprising a non-magnetic spider having a radially narrow ring portion of hardened steel mounted thereon, said ring portion being of uniform cross-section at the periphery nearest to the stator and being cut away elsewhere at a plurality of points to provide a circumferential path of variable magnetic reluctance.

4. A self-starting synchronous motor having a magnetically rotating field stator, and a rotor comprising a non-magnetic spider having radially narrow rings of hardened steel mounted thereon, said rings being of uniform cross-section at the periphery nearest to the stator and being cut away elsewhere at a plurality of points to provide a circumferential path of variable magnetic reluctance.

5. In a self-starting synchronous motor, a rotor comprising a non-magnetic spider and a ring portion of hardened steel mounted thereon, said ring portion being radially narrow and having a circular series of axial perforations.

6. In a self-starting synchronous motor, a rotor comprising a non-magnetic spider and a ring portion of hardened steel mounted thereon, said ring portion consisting of a plurality of radially narrow and axially thin rings having a circular series of axial perforations.

7. In a self-starting synchronous motor, a rotor comprising a non-magnetic spider and a radially narrow, axially perforated, hardened steel ring mounted thereon.

8. A rotor for self-starting synchronous motors, comprising a non-magnetic spider and a pair of axially perforated, radially narrow and axially thin, hardened steel rings mounted thereon.

9. A rotor according to claim 8, wherein the perforations through said rings are in alignment.

10. A rotor for self-starting synchronous motors, comprising a non-magnetic spider and a plurality of radially narrow and axially thin hardened steel rings mounted thereon, said rings having between their inner and outer peripheries, a plurality of circular holes.

11. A self-starting synchronous motor comprising in combination a field structure including a single field coil and at least two pole pieces in which each pole is divided into shaded and unshaded pole sections, a rotor positioned in the magnetic field of said pole and comprising a non-magnetic spider and a ring portion of hardened steel, said ring portion being of uniform thickness where closest to said pole sections, and cut away at a plurality of points equidistant from the axis of the ring portion to provide a circumferential path of variable magnetic reluctance.

12. A self-starting synchronous motor having a magnetically rotating field stator, and a rotor comprising a non-magnetic spider having a ring portion of hardened steel mounted thereon, said ring portion being of uniform cross-section at that periphery which is nearest the stator and being cut away at a plurality of points symmetrically positioned with respect to the axis of the ring portion.

13. The motor of claim 12 wherein the ring portion comprises steel rings carried by the non-magnetic spider.

14. The motor of claim 12 wherein the ring portion comprises two perforated steel rings mounted on the non-magnetic spider with their perforations in alinement.

MILTON E. THOMPSON.